July 2, 1968 — B. MOORE — 3,390,897
CONNECTOR
Filed Aug. 13, 1965
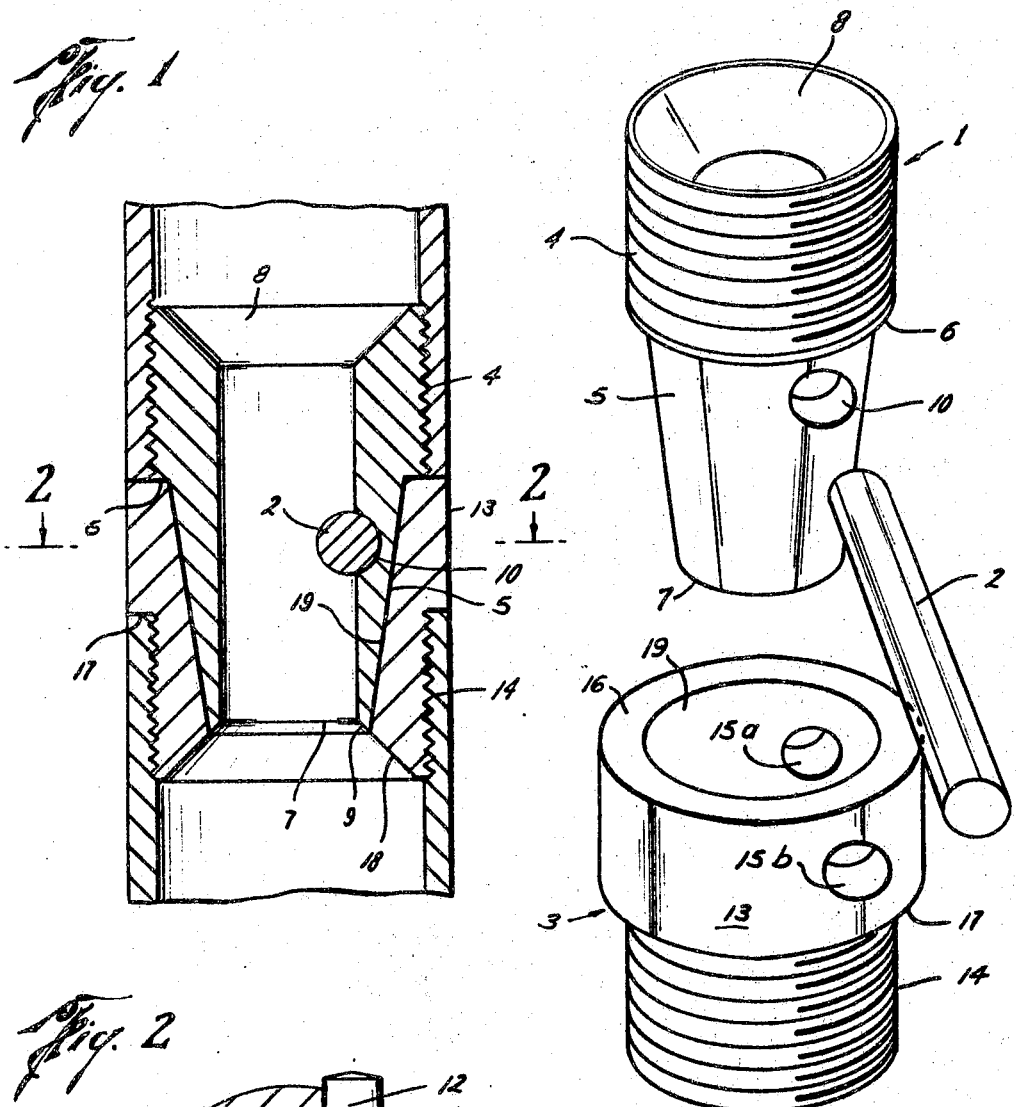
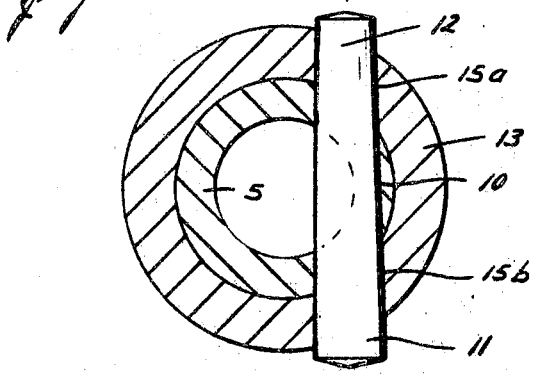
Buell Moore
INVENTOR.
BY Arnold and Roylance
ATTORNEYS

United States Patent Office 3,390,897
Patented July 2, 1968

---

3,390,897
CONNECTOR
Buell Moore, Houston, Tex., assignor to Esquire, Inc., New York, N.Y., a corporation of Delaware
Filed Aug. 13, 1965, Ser. No. 479,417
1 Claim. (Cl. 285—33)

This invention relates to an improved connector for two lengths of generally hollow rod or pipe.

In the past, lamps have been affixed to the tops of continuous rods or pipes which served as the support therefor and at the same time provided a conduit means of bringing electrical wiring to the lamp, the wiring being carried to the lamp through the generally hollow midportion of the rod or pipe. In some instances, lamps are mounted on rods or pipes of 40 or more feet in length.

There has long been a need, but before the present invention, there has been no satisfactory method of joining or connecting together two or more shorter lengths of generally hollow rod or pipe to make up the longer lengths. Although some connectors have been tried for this purpose, all have suffered from the defects of either requiring some member which protruded into the central or hollow area of the rod or pipe with the result that wires are snagged when they are passed through, or else engagement of the connector with the lengths of pipe is exceedingly cumbersome and difficult.

As a result of this lack of a satisfactory connector, the lengths of pipe or rod in use for such purposes continue to present a severe handling problem, even placing a limit on the lengths of rods or pipe that can be practically employed in some situations. For one example, lamp standards used to light parking lots are now commonly as long as 40 feet or more. It is evident that single pipes of such length are difficult to load, transport, and unload without bending, end damage, etc.

Accordingly, this invention seeks to provide an improved connector for joining two lengths of generally hollow rod or pipe.

In order that the manner in which the foregoing and other objects attained in accordance with the invention can be understood in detail, one advantageous embodiment of the invention will be described with reference to the accompanying drawings, which form a part of this specification, and wherein:

FIGURE 1 is a vertical section of a connector constructed in accordance with one embodiment of this invention.

FIGURE 2 is a cross sectional view taken along the line 2—2 of FIGURE 1.

FIGURE 3 is a pictorial illustration of the connector shown in FIGURES 1 and 2, illustrating the separate parts thereof.

Referring now in more detail to the drawings, there is illustrated a 3-piece connector constructed in accordance with one preferred embodiment of this invention. These three pieces may be designated first member, or male member 1, pin 2, and second member, or female member 3.

Male member 1 comprises two portions which are desirably constructed as a single integral piece, externally threaded portion 4 and tapered portion 5. Externally threaded portion 4 is of constant outside diameter, and is adapted to mate with an internally threaded portion of a length of pipe. Just below this threaded portion is a lip 6; hence, the outside diameter or tapered portion 5 of male member 1, even at its widest point, is significantly smaller than the outside diameter of the threaded portion. Tapered portion 5 is frusto-conical in shape and depends in progressively smaller outside diameter from its junction with threaded portion 4 at lip 6 to its terminus at edge 7, this portion being of maximum outside diameter at lip 6 and of minimum outside diameter at edge 7. The inside diameter of male member 1 is desirably approximately constant throughout both portions thereof.

It is desirable, however, to include an internally tapered portion 8 at the end of threaded portion 4 opposite tapered portion 5 for the purpose of facilitating guidance of wires, etc. into the hollow portion in the center thereof to minimize the possibility of snagging. Likewise, it is desirable to include an internally tapered portion 9 at edge 7, which will be in tapering alignment with a corresponding portion of female member 3. This taper, also, is for the purpose of facilitating the passage of wires, etc. into the interior of the connector.

Female member 3 is also comprised of two portions, collar or external flange portion 13 and externally threaded portion 14, but again these portions are preferably integral in a single piece. Threaded portion 14 is of constant outside diameter which is desirably the same as the outside diameter of externally threaded portion 4 of male member 1, so that the connector is interchangeable; that is, has no top or bottom. The internal frusto-conically tapered surface 19 of female member 3 is adapted to mate with depending tapered portion 5 of male member 1.

Male member 1 further includes, in the tapered portion thereof, means adapted for holding pin 2, namely a hole 10. As will be apparent from FIGURES 1 and 2, this hole is transverse to the longitudinal axis of the member, and offset therefrom, actually being partially recessed in the internal wall of male member 1. That is, when pin 2 is inserted in hole 10, less than the total diameter of the pin is always exposed in the hollow interior opening of the member 1. In this manner, since only one side of pin 2 is so exposed, the pin does not interfere with any wires or whatever else that may occupy or pass through the interior of the connector, and nothing can become tangled on the back side of the pin.

In addition to being constructed in the foregoing manner, it may also be desirable to actually taper the hole 10 itself, so that it will be adapted to receive only a certain size tapered pin 2. If this is done, pin 2 will, of course, be able to enter the hole 10 from only one direction. Such a construction has been found particularly advantageous as it permits ready insertion of the pin and prevents the pin from slipping out of the connector after it has been so inserted. And since male member 1 and female member 3 are usually held together in mating engagement for machining of the hole, tapering of this hole will facilitate ready positioning of the male and female components to the mating position at which hole 10 is aligned with the corresponding hole in the female member.

Pin 2 is designed to fit the hole 10 and may desirably be constructed of the same material used for the male and female members. As noted above, it has been found distinctly advantageous to frusto-conically taper pin 2 from a wide end 11 to a narrow end 12.

Collar 13 of female member 3 includes holes 15a and 15b therein, these holes corresponding in size and configuration to the hole 10 in male member 1, and the pin 2. In the position of mating engagement of members 1 and 2, pin 2 is inserted through hole 15a, hole 10 and hole 15b to securely interlock male member 1 from axial and rotational movement with respect to female member 2, hence fixedly securing the two members together. That is, these holes, too, are transverse to the longitudinal axis of the member and offset therefrom in the same relationship as the hole 10 in male member 1 (including frusto-conical tapering, if any).

Collar portion 13 includes at one extremity thereof a flat annular surface 16 which will, when the female member is mated with the male member, abut the lip 6 of male member 1. At the other extremity thereof, collar portion 13 includes a lip 17 which joins externally threaded portion 14.

Externally threaded portion 14 is also of constant outside diameter, and is designed to mate with a corresponding internally threaded length of pipe. Of course, this diameter is considerably less than the diameter of the collar portion 13. The inside diameter of female member 3 is tapered from a maximum at the flat annular surface 16 of collar portion 13 to a minimum at the opposite end of threaded portion 14. It is evident that this taper will correspond to the external taper of portion 5 of male member 1.

Further, it is particularly desirable to include, at the end of threaded portion 14 opposite collar 13, an internal taper 18 which will conveniently serve to facilitate guidance of wires, etc. into the interior of the connector. The taper of this portion 18 will generally correspond to the tapered portion 9 of edge 7 of the male member.

When the connector is joined to a couple of lengths of pipe, it is seen that wires, etc. may be easily guided into the interior thereof, and that such wires, etc. cannot become snagged, damaged or tangled on any protrusion in the generally hollow interior opening of the connector. Further, it is seen that the connector will rigidly hold together two lengths of pipe or rod, and that it is easily and conveniently inserted or removed.

It should also be noted that the externally threaded portions 4 and 14 of male member 1 and female member 3, respectively, may be made substantially identical in diameter and type of thread. In such event, the members may be used interchangeably in pipe having compatible matching internally threaded ends.

However, diameter size, thread pitch, etc. may be different for threaded portions 4 and 14. In this event, the connector members may be used to ensure the proper assembly of pipe sections which for some reason distinguish from one another. For instance, graduated pipe sections may be employed that should be mated only in one sequence. Connectors which can only fit the ends of pipe sections one way ensure proper assembly of the sections by even the most inexperienced assembler.

While the embodiment disclosed has been in terms of the male and female members each including an externally threaded portion, it is emphasized that there are times when these threads need not be present. That is, the male and female members of the connector may be welded, instead of threaded, to the lengths of pipe with which they connect.

And even if a threaded portion is included on each male and female member, this portion could be internal instead of external, although the external threading as disclosed herein is the preferred embodiment.

While various materials of constructions, such as cast iron, stainless steel, or synthetic polymeric material, may be used, cast aluminum has been found distinctly advantageous for many applications.

While the invention has been described in terms of one particularly useful embodiment, it will be evident to those skilled in the art that various changes and modifications may be made herein without departing from the scope of the invention.

I claim:
1. A device for connecting two lengths of generally hollow pipe comprising in combination:
 a first tubular member having a bore therethrough and an externally threaded portion of constant outside diameter, and
 a portion of progressively smaller diameter tapering therefrom, said tapered portion including a transverse hole therein offset from the longitudinal axis of the member;
 a second tubular member having a tapered bore therethrough complementary to said tapered portion of said first member and a collar portion, and
 an externally threaded portion of constant outside diameter equal to the diameter of the externally threaded portion of said first tubular member,
 said tapered portion of said first member fitting snugly within said tapered bore of said second member,
 said collar portion being of larger outside diameter than said externally threaded portion, said collar diameter being substantially equal to the outside diameter of the two lengths of hollow pipe so that the assembly of pipes and tubular members has a substantially continuous outer surface of substantially constant diameter, said collar portion having a transverse hole therein offset from the longitudinal axis of said second member in the same relation as the hole in said first member; and
 a pin engaging said hole and thereby securely locking said second member to said first member while leaving an unobstructed central longitudinal channel through said device,
wherein each said first member and said second member includes means thereon for facilitating guidance of wiring through the center thereof in either axial direction, said means including tapering surfaces at each end of said first member and at one end of said second member, said tapering end of said second member and one of said tapering ends of said first member forming a substantially continuous tapering surface extending substantially from the threaded portion on said second member to the bore of said first member and the tapering surface at the opposite end of the first member extending substantially from the threaded surface thereon to the bore therethrough.

References Cited
UNITED STATES PATENTS

| | | | |
|---|---|---|---|
| 852,759 | 5/1907 | Bergener | 287—53 |
| 1,079,681 | 11/1913 | Wintroath | 285—333 X |
| 1,096,690 | 5/1914 | Derbyshire | 285—332 X |
| 1,326,643 | 12/1919 | Burns | 285—399 X |
| 1,658,264 | 2/1928 | Sutton et al. | 285—305 X |
| 1,800,840 | 4/1931 | Lewin | 285—176 X |
| 2,463,124 | 3/1949 | Sims | 285—421 X |
| 52,214 | 1866 | Shone | 285—403 |

CARL W. TOMLIN, *Primary Examiner.*

D. W. AROLA, *Assistant Examiner.*